United States Patent
Hasegawa

(10) Patent No.: US 10,144,076 B2
(45) Date of Patent: Dec. 4, 2018

(54) WIRE ELECTRIC DISCHARGE MACHINE CAPABLE OF STARTING MACHINING FROM SHORT-CIRCUIT STATE

(71) Applicant: FANUC Corporation, Yamanashi (JP)

(72) Inventor: Yasuo Hasegawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 646 days.

(21) Appl. No.: 14/823,360

(22) Filed: Aug. 11, 2015

(65) Prior Publication Data

US 2016/0045966 A1    Feb. 18, 2016

(30) Foreign Application Priority Data

Aug. 12, 2014    (JP) ................................. 2014-164470

(51) Int. Cl.
    *B23H 1/02*      (2006.01)
    *B23H 7/02*      (2006.01)
    *B23H 7/04*      (2006.01)

(52) U.S. Cl.
    CPC ............ *B23H 1/024* (2013.01); *B23H 1/026* (2013.01); *B23H 7/02* (2013.01); *B23H 7/04* (2013.01)

(58) Field of Classification Search
    CPC .......... B23H 1/024; B23H 1/026; B23H 7/02; B23H 7/04
    See application file for complete search history.

(56) References Cited

U.S. PATENT DOCUMENTS

| | | | | |
|---|---|---|---|---|
| 4,242,555 A | * | 12/1980 | Delpretti ................ | B23H 1/024 219/69.13 |
| 4,798,929 A | * | 1/1989 | Itoh ........................ | B23H 1/024 219/69.12 |
| 2005/0051519 A1 | | 3/2005 | Satou et al. | |
| 2008/0110865 A1 | | 5/2008 | Hashimoto et al. | |
| 2012/0048833 A1 | * | 3/2012 | Kawahara .............. | B23H 1/022 219/69.13 |
| 2012/0228270 A1 | * | 9/2012 | Murai .................... | B23H 1/022 219/69.13 |

FOREIGN PATENT DOCUMENTS

| | | |
|---|---|---|
| JP | 50-127297 A | 10/1975 |
| JP | 54-156296 A | 12/1979 |
| JP | 3-287315 A | 12/1991 |

(Continued)

OTHER PUBLICATIONS

Office Action in JP Application No. 2014-164470, dated Aug. 8, 2017, pp. 31.

(Continued)

*Primary Examiner* — Geoffrey S Evans
(74) *Attorney, Agent, or Firm* — Hauptman Ham, LLP

(57) ABSTRACT

Even if a machining gap between a wire electrode and workpiece is in a short-circuit state at a start of machining by a wire electric discharge machine, a high-frequency voltage in a pulse shape is applied and a small current is supplied to an extent that the wire electrode is not fused only in an initial fixed time at the start of machining. Then, the short circuit is released, though instantaneously, and a discharge occurs in that instant and the short circuit state is eliminated by discharge repulsion thereof and therefore, machining can be started.

8 Claims, 15 Drawing Sheets

(56) References Cited

FOREIGN PATENT DOCUMENTS

| JP | 4-115821 | 4/1992 |
|---|---|---|
| JP | 2013-121654 A | 6/2013 |
| WO | 03/089175 A1 | 10/2003 |

OTHER PUBLICATIONS

Extended European Search Report in Ep Application No. 15179514.3 dated Jan. 8, 2016.
Office Action in JP Application No. 2014-164470 dated Dec. 1, 2015.

\* cited by examiner

FIG.2A

WAVEFORM EXAMPLE OF HIGH-FREQUENCY VOLTAGE PULSE AND LARGE-CURRENT PULSE SUPPLIED IN OPEN STATE (WAVEFORM IN SHORT-CIRCUIT STATE)

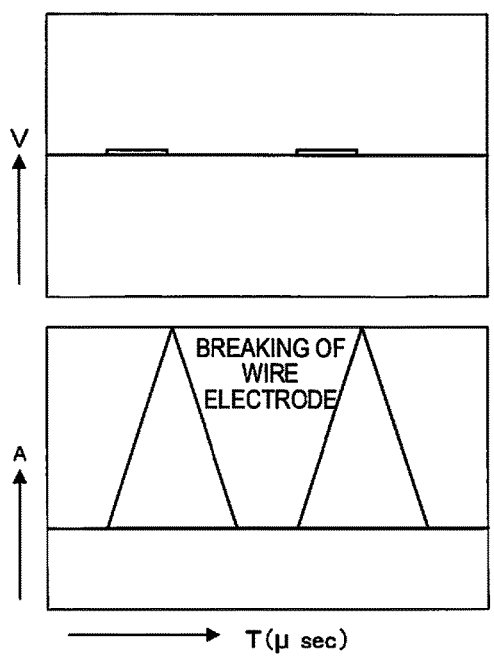

WHEN HIGH-CURRENT PULSE TO BE SUPPLIED IN OPEN STATE IS SUPPLIED IN SHORT-CIRCUIT STATE, MACHINING GAP RESISTANCE IS LOW AND OVER-CURRENT FLOWS TO WIRE, LEADING TO FUSING BY JOULE HEAT.

FIG.2B

WAVEFORM EXAMPLE OF HIGH-FREQUENCY VOLTAGE PULSE AND SMALL-CURRENT PULSE SUPPLIED IN SHORT-CIRCUIT STATE IN THE PRESENT INVENTION (WAVEFORM IN SHORT-CIRCUIT STATE)

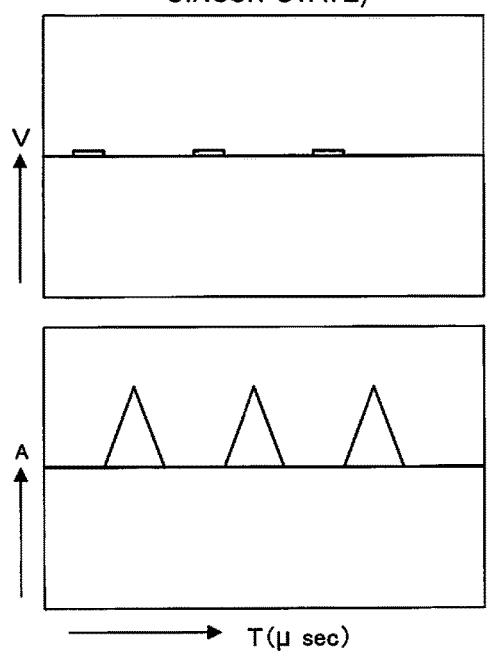

SMALL-CURRENT PULSE NOT ENOUGH TO FUSE WIRE ELECTRODE BY JOULE HEAT OF CURRENT FLOWING TO THE WIRE ELECTRODE DUE TO LOW MACHINING GAP RESISTANCE IN SHORT-CIRCUIT STATE IS SUPPLIED.

FIG.3A
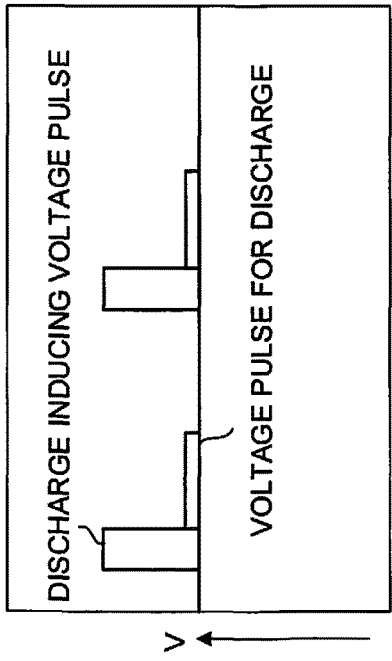
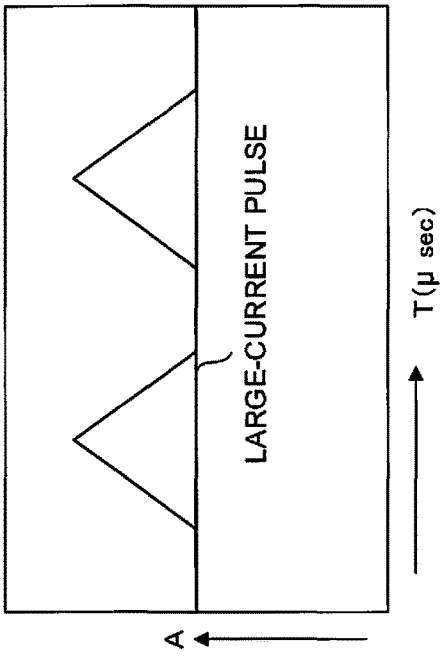
WAVEFORM EXAMPLE OF HIGH-FREQUENCY VOLTAGE PULSE AND SMALL-CURRENT PULSE SUPPLIED IN SHORT-CIRCUIT STATE IN THE PRESENT INVENTION (WAVEFORM IN OPEN STATE)
FIG.3B
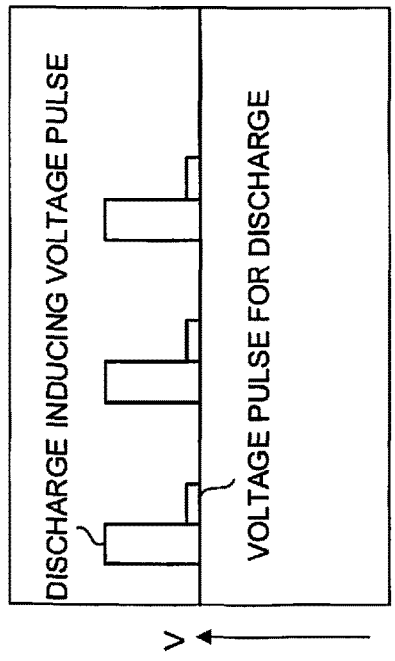
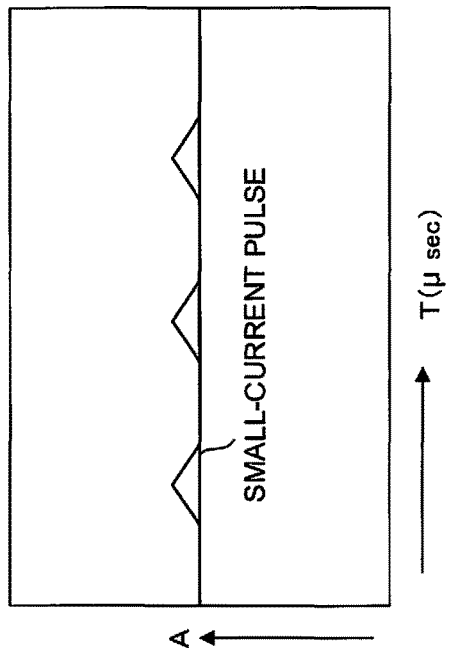
WAVEFORM EXAMPLE OF HIGH-FREQUENCY VOLTAGE PULSE AND LARGE-CURRENT PULSE SUPPLIED IN OPEN STATE IN THE PRESENT INVENTION (WAVEFORM IN OPEN STATE)

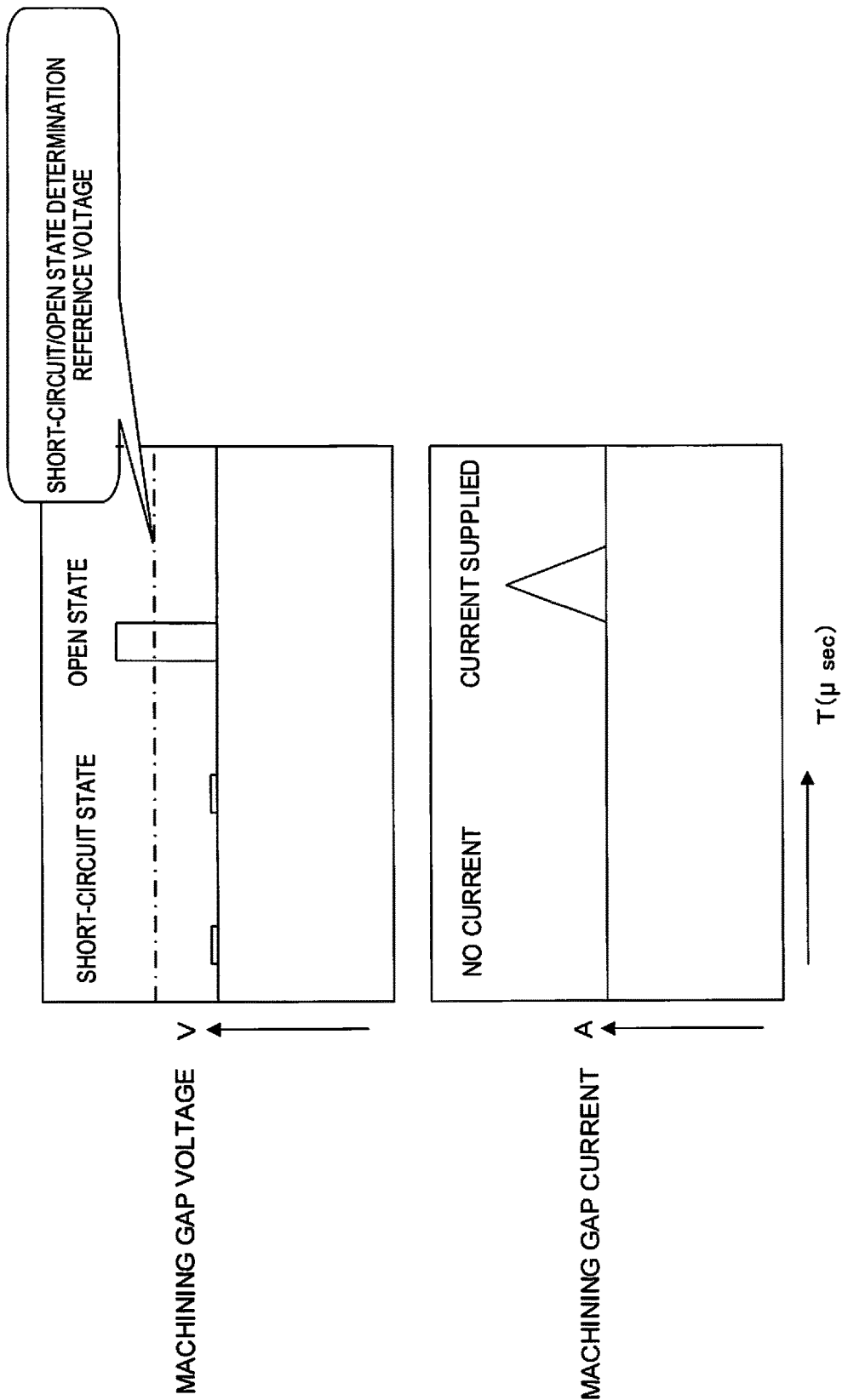

WHEN OPEN STATE IS DETECTED AND DISCHARGE CURRENT SUPPLY
CONTINUES FOR FIXED PERIOD, SWITCHING TO NORMAL MACHINING
CONDITIONS IS MADE

WIRE ELECTRIC DISCHARGE MACHINE CAPABLE OF STARTING MACHINING FROM SHORT-CIRCUIT STATE

RELATED APPLICATIONS

The present application claims priority to Japanese Application Number 2014-164470, filed Aug. 12, 2014, the disclosure of which is hereby incorporated by reference herein in its entirety.

BACKGROUND OF THE INVENTION

1. Field of the Invention

The present invention relates to a wire electric discharge machine, and in particular, relates to a wire electric discharge machine capable of starting discharge machining even if a machining gap between a wire electrode and workpiece is in a short-circuit state when machining is started.

2. Description of the Related Art

A wire electric discharge machine is devised such that if machining is started in a state in which a wire electrode and workpiece are not short-circuited, that is, in an open state when machining is started by passing a wire electrode through a minor-diameter machining start hole of the workpiece, machining can be performed in a stable manner without a high-energy discharge current flowing at once due to the presence of a resistant working fluid, for example, resistivity-controlled water or oil in a machining gap between the wire electrode and workpiece and also without fusing (breaking of wire electrode) of the wire electrode with the long-lasting discharge current limited by the resistance.

On the other hand, as shown in FIG. 16A, when machining is started, an outer circumferential surface of a wire electrode 1 may be in contact with, that is, short-circuited with an inner surface of a minor-diameter machining start hole 3 due to a positional displacement of the wire electrode 1 with respect to the center of the small-diameter machining start hole 3. It is well known that when machining is started in a short-circuit state and a power supply voltage is applied and a discharge current is supplied to a machining gap in a wire electric discharge machine, a current flows at once from workpiece 2 to the wire electrode 1 (or from the wire electrode 1 to the workpiece 2) and the wire electrode 1 is fused due to Joule heat generated by the resistance of the wire electrode 1. Therefore, the application of a power supply voltage and the supply of a discharge current are normally avoided in a short-circuit state.

To cope with such a problem, for example, JP 03-287315 A discloses a technology that, if a short-circuit state is detected when machining is started, eliminates the short-circuit state when machining is started by a wire electric discharge machine by repeating relative micro-distance movement to search for a position where the short-circuit state is eliminated.

However, the above technology has the problem described below.

Unfortunately, if the small-diameter machining start hole 3 of the workpiece 2 is minute and close to the wire diameter of the wire electrode 1, the small-diameter machining start hole 3 is formed so as to extend obliquely as shown in FIG. 16B, instead of being perpendicular to the workpiece 2, and thus, the wire electrode 1 and the small-diameter machining start hole 3 are not parallel and the wire electrode 1 and the upper edge or the lower edge of the workpiece 2 are in contact, there is a burr 4 on the inner surface of the small-diameter machining start hole 3 as shown in FIG. 16C, or the wire electrode 1 is erected not vertically, but obliquely as shown in FIG. 16D, the possibility of being able to eliminating a short-circuit state is small even if the technology described in JP 03-287315 A is used.

SUMMARY OF THE INVENTION

An object of the present invention is to provide a wire electric discharge machine capable of starting discharge machining from a small-diameter hole or a small-diameter machining start hole in which a burr remains or which extends obliquely, from which it has been impossible to start machining.

A wire electric discharge machine according to the present invention includes a discharge inducing circuit including a first DC power supply connected to a machining gap between a wire electrode and work via a first switching element and a current limiting resistance, a current supply circuit including a second DC power supply connected to the machining gap via a second switching element, a voltage detection circuit that detects a voltage of the machining gap, a short-circuit detection unit that detects a short-circuit state between the wire electrode and the workpiece based on the voltage detected by the voltage detection circuit, and a control circuit that controls on and off of the first switching element and the second switching element.

Then, in a first form of the wire electric discharge machine according to the present invention, the control circuit is configured to supply a predetermined discharge current to an extent that the wire electrode is not fused even in a short-circuit state with the workpiece until a predetermined state is reached after starting machining.

In a second form of the wire electric discharge machine according to the present invention, the control circuit is configured to supply a predetermined discharge current to an extent that the wire electrode is not fused even in a short-circuit state with the workpiece until a predetermined state is reached when the short circuit is detected by the short-circuit detection unit at a start of machining.

In a third form of the wire electric discharge machine according to the present invention, the control circuit is configured to supply a predetermined discharge current to an extent that the wire electrode is not fused even in a short-circuit state with the workpiece until a predetermined state is reached after the wire electrode and the workpiece reach an open state by a pulse voltage being applied to the machining gap when the short circuit is detected by the short-circuit detection unit at a start of machining.

The wire electric discharge machine according to the present invention may be configured to change to preset machining conditions when the short-circuit detection unit detects elimination of the short circuit between the wire electrode and the workpiece.

The wire electric discharge machine according to the present invention may also be configured to change at least one of a wire tension of the wire electrode, a flow rate of a working fluid, and a wire feed speed of the wire electrode until the short circuit is eliminated when the short circuit between the wire electrode and the workpiece is not eliminated before the predetermined state is reached.

In the wire electric discharge machine according to the present invention, the predetermined state may be at least one of a preset time, a preset distance, and a preset number of times of discharge.

In the wire electric discharge machine according to the present invention, a discharge current to the extent that the wire electrode is not fused even in the short-circuit state of the wire electrode and the workpiece may be determined by an experiment while each of a diameter, a material and a type of the wire electrode, a material and thickness of the workpiece to be machined, a specific resistance of a working fluid, and a wire tension needed to cause the wire electrode to travel is set.

According to the present invention, machining can be started from a small-diameter hole from which it has been impossible to start machining due to a short-circuit state or a small-diameter machining start hole in which a burr remains or which extends obliquely and thus, conventional setup work requiring plenty of time to eliminate a short circuit can be omitted, which can greatly contribute to increasing productivity.

BRIEF DESCRIPTION OF THE DRAWINGS

The forgoing and other objects and feature of the invention will be apparent from the following description of preferred embodiments of the invention with reference to the accompanying drawings, in which:

FIG. 2A is a diagram illustrating that if a high-current pulse used for normal discharge machining is supplied to a machining gap when the machining gap is in a short-circuit state, an over-current flows to a wire electrode due to low machining-gap resistance and the wire electrode is fused;

FIG. 2B is a diagram illustrating that a machining-gap voltage and a machining-gap current are controlled such that a small-current pulse that does not fuse the wire electrode when the machining gap is in a short-circuit state and is enough for discharge removal of a work surface when the wire electrode approaches in an open state is supplied to the machining gap;

FIGS. 3A and 3B are graphs showing waveforms of a high-frequency voltage pulse and a current pulse supplied by the wire electric discharge machine in FIG. 1 from a small-diameter machining start hole when machining is started;

FIG. 4 is a diagram illustrating a method of detecting a short circuit between the wire electrode and the workpiece;

DETAILED DESCRIPTION OF THE PREFERRED EMBODIMENTS

Figure 1:
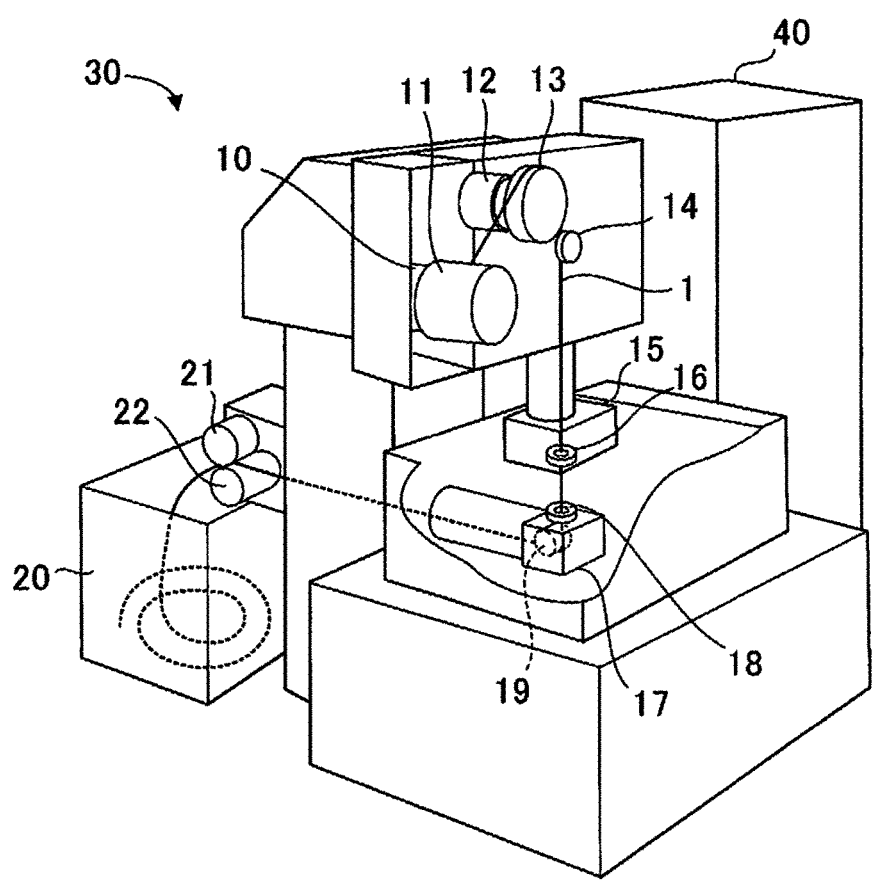
FIG. 1 is a schematic diagram of a wire electric discharge machine according to an embodiment of the present invention.

Conventional wire electric discharge machines are so designed not to apply a power supply voltage for discharge and not to supply a discharge current when a wire electrode and workpiece are in a short-circuit state because breaking of wire electrode is highly probable.

However, by repeating experiments, the inventors found that if, while a wire electrode and workpiece are short-circuited, the wire electrode is caused to travel under a slight wire tension in a wire traveling direction, a working fluid is supplied, and the application of a high-frequency voltage in a pulse shape and the supply of a discharge current are continued to the extent that a wire electrode line is not fused, the short-circuit state may be, though instantaneously, eliminated between the wire electrode and the workpiece due to vibration of the wire electrode, an insulating film attributable to oil content attached to the surface of the wire electrode, or other factors and a discharge can be caused in that instant.

Then, if a discharge occurs even once, the wire electrode is pushed back from the workpiece surface by discharge repulsion thereof and a gap to the workpiece can be created and further, the short-circuited surface can be fusion-removed through the discharge by continuing the discharge, showing that machining can be started by getting out of the short-circuit state.

Therefore, the inventors invented a wire electric discharge machine having a function of being able to apply a high-frequency voltage and supply a discharge current to the extent that a wire electrode is not fused specially only in an initial fixed period when machining is started and capable of starting machining by eliminating a short circuit through discharge removal even if the wire electrode and workpiece are in a short-circuit state when machining is started.

A wire electric discharge machine according to an embodiment of the present invention will be described using FIG. 1.

In a wire electric discharge machine 30, predetermined low torque instructed in a direction opposite to a drawing-out direction of a wire electrode 1 is given by a delivery torque motor 10 to a wire bobbin 11 around which the wire electrode 1 is wound. The tension of the wire electrode 1 drawn out of the wire bobbin 11 between a brake shoe 13 and a feed roller 22 driven by a wire electrode feeding motor (not shown) is adjusted by the brake shoe 13 driven by a brake motor 12 via a plurality of guide rollers (not shown).

A tension detector 14 detects the magnitude of tension of the wire electrode 1 traveling between an upper guide 15 and a lower guide 17. The wire electrode 1 having passed through the brake shoe 13 is inserted between a pinch roller 21 and a feed roller 22 driven by a wire electrode feeding motor (not shown) after going through an upper wire support guide 16 included in the upper guide 15, a lower wire support guide 18 included in the lower guide 17, and a lower guide roller 19, and then collected in a wire electrode collection box 20.

The workpiece (not shown) as an object of electric discharge machining is placed on a table (not shown) in a electric discharge machining area between the upper guide 15 and the lower guide 17 and a high-frequency voltage is applied from a machining power supply to the wire electrode 1 for electric discharge machining. The body of the wire electric discharge machine 30 is controlled by a controller 40.

Next, an overview of discharge control of the wire electric discharge machine 30 in an embodiment of the present invention will be explained with reference to FIGS. 2A to 5.

When, as shown in FIG. 2A, the machining gap between the wire electrode 1 and the workpiece is in a short-circuit state, if a high-current pulse used for normal electric discharge machining that should be supplied in an open state is supplied to the machining gap, an over-current flows to the wire electrode 1 due to low machining-gap resistance and the wire electrode 1 is fused due to Joule heat.

Therefore, in the present embodiment, as shown in FIG. 2B, the machining-gap voltage and the machining-gap current are controlled such that a small-current pulse that does not fuse the wire electrode 1 when the machining gap between the wire electrode 1 and the workpiecepiece is in a short-circuit state and is enough for discharge removal of a workpiece surface when the wire electrode approaches in an open state (state in which the wire electrode and the workpiece are not short-circuited) is supplied.

The small current is different depending on the diameter of the wire electrode used for actual machining of a workpiece, the material and the type of the wire electrode, the work material and the thickness of the workpiece to be machined, the specific resistance of the working fluid, and the wire tension needed to cause a wire to travel and thus, the amount of current to be supplied may be determined in advance by carrying out an experiment by setting each machining condition to the wire electric discharge machine or by calculation.

FIGS. 3A and 3B are graphs showing waveforms of a high-frequency voltage pulse and a current pulse supplied by the wire electric discharge machine in FIG. 1 from a small-diameter machining start hole when machining is started.

In the wire electric discharge machine 30 in FIG. 1, as shown in FIG. 3A, even if a short-circuit state is detected between the wire electrode 1 and the workpiece when a discharge inducing voltage in a pulse shape is applied to the machining gap between the wire electrode 1 and the workpiece, a small high-frequency current to the extent that the wire electrode 1 is not fused is supplied by the voltage for discharge in a pulse shape. By supplying such a small current to the machining gap, the current can be supplied to the machining gap even in a short circuit without causing the breaking of the wire electrode 1 and if an open state arises even instantaneously during the supply of the small current, an edge of the workpiece can slightly be removed by machining. Then, by supplying such a small current in a pulse shape repeatedly, the transition of the space between the wire electrode 1 and the workpiece to a stable open state can be expected through discharge repulsion and fusion removal of the workpiece surface by a small-current discharge.

Then, as shown in FIG. 3B, if an open state is detected between the wire electrode 1 and the workpiece when the discharge inducing voltage in a pulse shape is applied to between the wire electrode 1 and the workpiece, normal electric discharge machining can be started by supplying a current pulse supplied under original machining conditions set for electric discharge machining.

Whether the space between the wire electrode 1 and the workpiece is in a short-circuit state or an open state may be determined by, as shown in FIG. 4, setting a short-circuit/open state determination reference voltage to discriminate the short-circuit state and the open state and observing a rise voltage of a machining gap voltage when the discharge inducing voltage is applied to make a determination based on whether the machining gap voltage exceeds the short-circuit/open state determination reference voltage.

Figure 5:
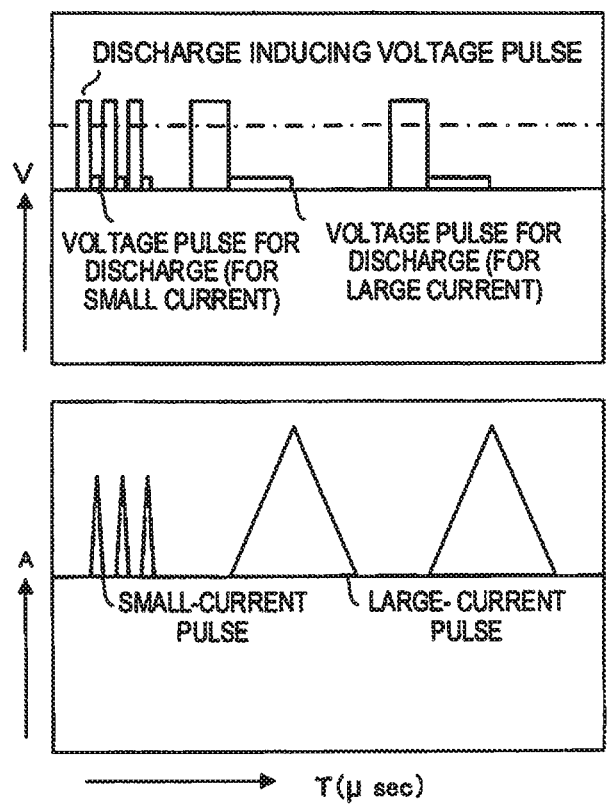
FIG. 5 is a diagram showing an example of the voltage pulse and the current pulse applied to the machining gap by the electric discharge machine according to an embodiment of the present invention.

If, as shown in FIG. 5, the detection of an open state and the supply of a discharge current continue for a certain period, control may be carried out so that machining condition is switched to normal machining conditions set for electric discharge machining in order to prevent the wire electrode from being broken due to supplying of a large current for a temporary elimination of the short circuit.

Thus, in the present invention, a small current that does not break the wire electrode is supplied as a current supplied when a machining program is started and therefore, if a short circuit should occur in an instant after the determination before the current being supplied, there is no possibility of the wire electrode being broken.

If the short circuit is not eliminated after waiting for a certain period, a state in which the wire electrode is more likely to be separated from the workpiece is created by changing the water pressure and wire tension one after another or providing vibration to the wire. If the short circuit is not eliminated after waiting for another certain period, the voltage application is stopped, machining start processing is interrupted, and stop processing of the program is performed, and then an alarm of the short-circuit elimination is displayed.

Principal units of a machining power supply circuit 50 included in the controller of a wire electric discharge machine according to the present invention to generate a machining gap voltage and a machining gap current will be described using FIG. 6.

The machining power supply circuit 50 includes a discharge inducing circuit 51 to induce a discharge in the machining gap and a current supply circuit 52 to perform removal machining of workpiece. The discharge inducing circuit 51 includes a first DC power supply 53 and the first DC power supply 53 is connected to the machining gap formed by the wire electrode 1 and the workpiece via the first switching element S1 and a current limiting resistance 54.

On the other hand, the current supply circuit 52 includes a second DC power supply 55 and the second DC power supply 55 is connected to the machining gap formed by the wire electrode 1 and the workpiece via the second switching element S2. Reference numeral 56 is a floating inductance generated by wires and the like and can store inductive energy.

The machining power supply circuit 50 further includes a discharge detection unit 57 that detects whether a discharge occurs in the machining gap and a control circuit 58 that controls on/off of each switching element.

Figure 6:
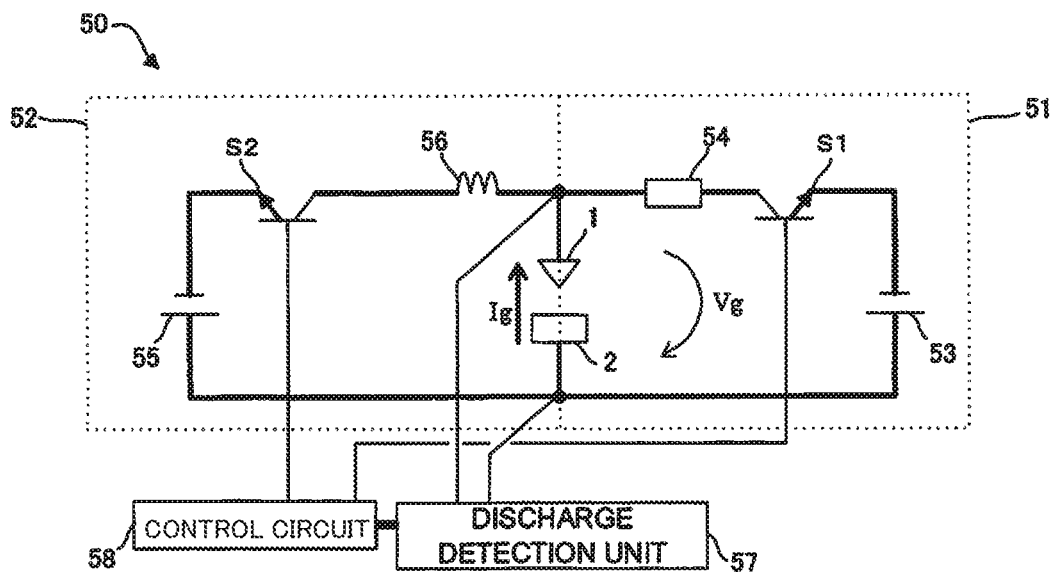
FIG. 6 is a diagram showing principal units of a machining power supply circuit included in a controller of the wire electric discharge machine according to the present invention to generate the machining-gap voltage and machining-gap current.

In the machining power supply circuit 50 in FIG. 6, the first switching element S1 is used to detect a short-circuit state of the machining gap by a discharge inducing pulse voltage after the pulse voltage being applied to the machining gap between the wire electrode 1 and the workpiece and also used in an open state to induce a discharge by breaking down insulation of the machining gap. On the other hand, the second switching element S2 is used, like the conventional technology, to machine the work by applying a machining pulse voltage to the machining gap and also to supply a small current to the machining gap to the extent that it does not break (fuse) the wire electrode 1 even if supplied to the machining gap between the wire electrode 1 and the workpiece in a short circuit state, which is a feature of the present invention. The value of the small current supplied to the machining gap is determined, as described above, by experiment or calculation in advance and is set as a setting parameter of the controller 40.

The operation of the machining power supply circuit 50 configured as described above will be described using FIGS. 7 and 8.

Figure 7:
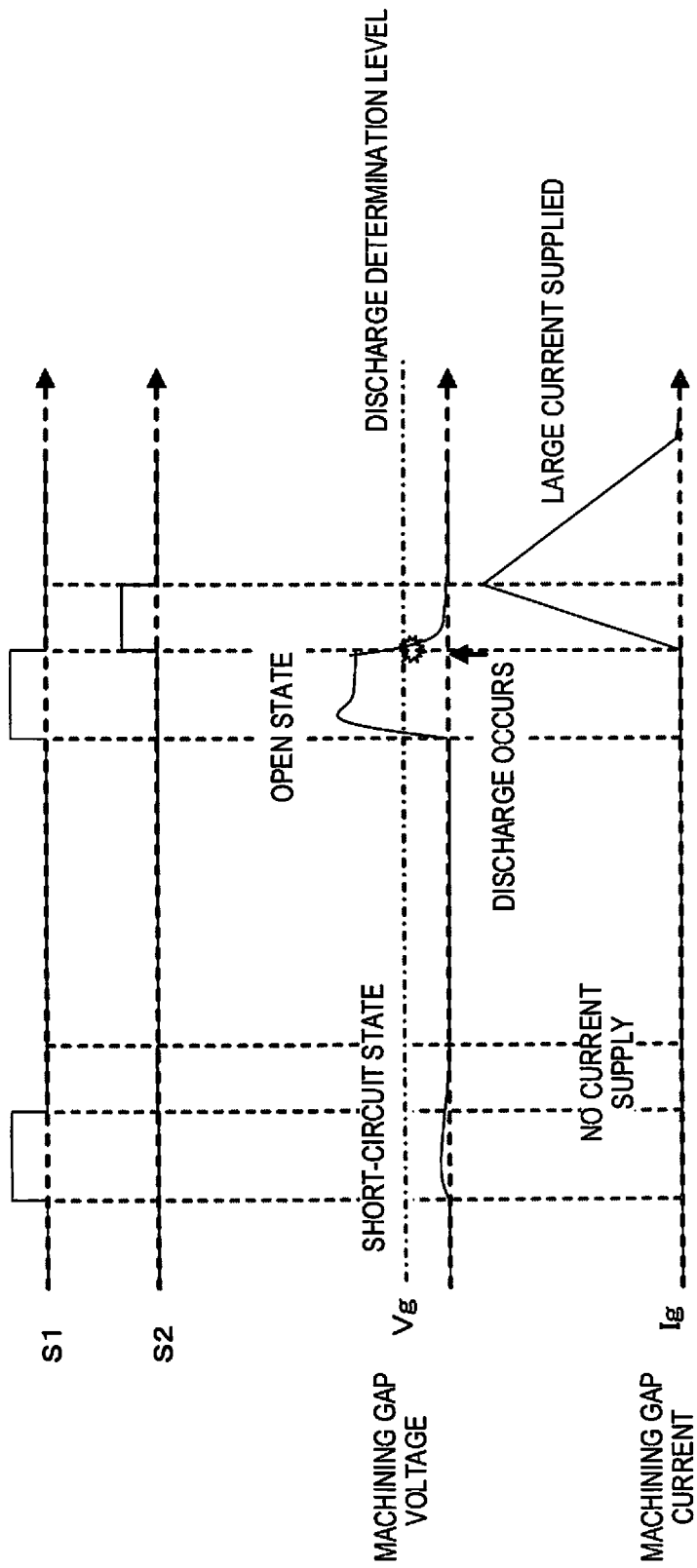
FIG. 7 is a time chart illustrating a relationship between a machining-gap voltage Vg and a machining-gap current Ig in control of a first switching element S1 and a second switching element S2 of the machining power supply circuit performed by the controller included in a conventional wire electric discharge machine.

FIG. 7 is a time chart illustrating a relationship between the machining-gap voltage Vg and the machining-gap current Ig in control of the first switching element S1 (to apply a discharge inducing pulse voltage to the machining gap) and the second switching element S2 (to apply a machining pulse voltage to the machining gap) of the machining power supply circuit performed by the controller included in a conventional wire electric discharge machine.

According to the conventional technology, the first switching element S1 is first turned on to apply a discharge inducing pulse voltage to the machining gap. If machining-gap voltage Vg is hardly detected at this point, the machining gap between the wire electrode 1 and the workpiece is determined to be in a short-circuit state and control is performed such that the first switching element S1 is turned off after a fixed time passes and the second switching element S2 is kept in off state not to supply discharge current to the machining gap.

If the machining-gap voltage Vg is detected and a discharge is detected by the discharge detection unit 57, the machining gap between the wire electrode 1 and the workpiece is determined to be in an open state and the first switching element S1 is turned off and also the second switching element S2 is turned on for a fixed time to perform electric discharge machining of the workpiece by supplying a large current.

Then, a quiescent time is provided to restore insulation of the machining gap before completing 1-cycle electric discharge machining.

Figure 8:
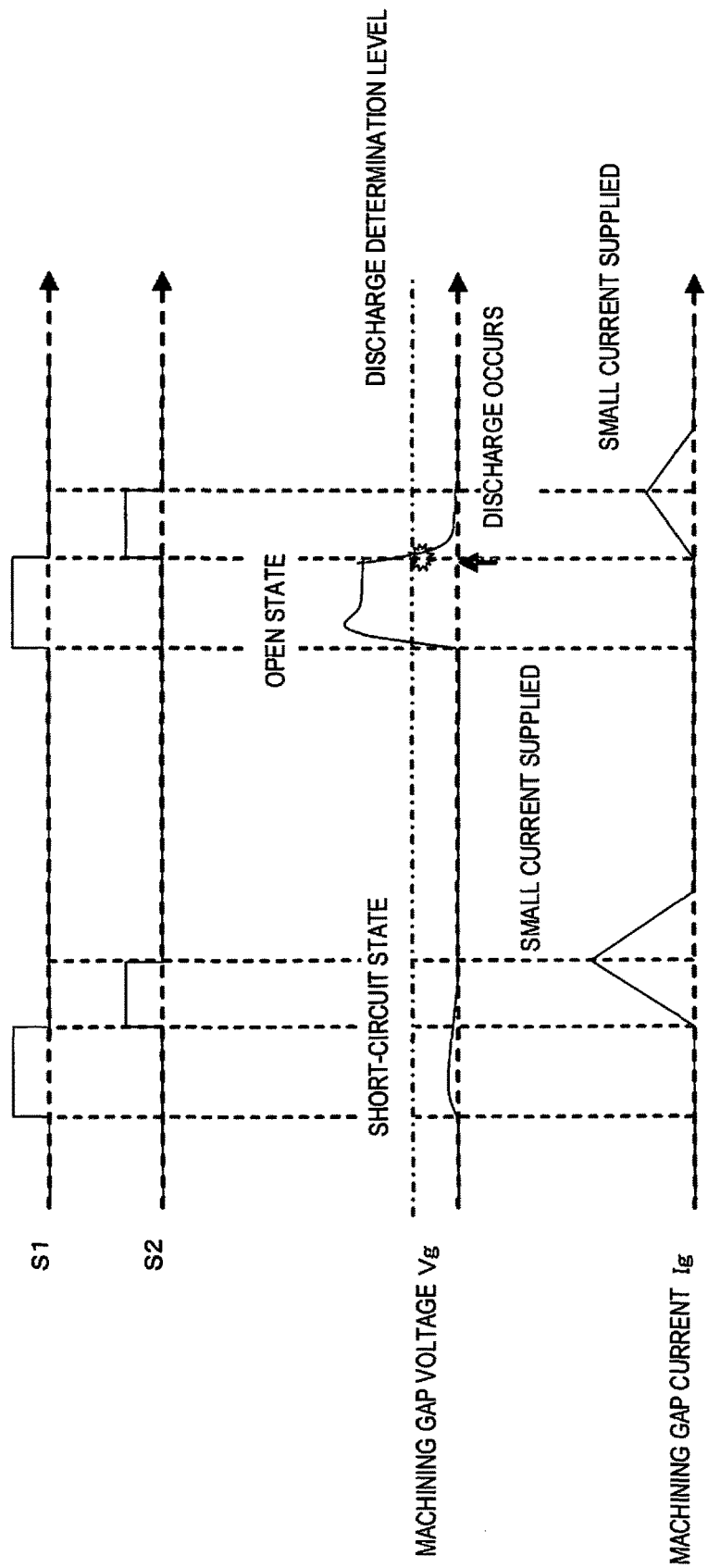
FIG. 8 is a time chart illustrating the relationship between the machining-gap voltage Vg and the machining-gap current Ig in control of the first switching element S1 and the second switching element S2 of the machining power supply circuit in FIG. 6 performed by the controller of the wire electric discharge machine according to the present invention.

FIG. 8 is a time chart illustrating the relationship between the machining-gap voltage Vg and the machining-gap current Ig in control of the first switching element S1 and the second switching element S2 of the machining power supply circuit 50 in FIG. 6.

In an embodiment of the present invention, the first switching element S1 is first turned on to apply a discharge inducing pulse voltage to the machining gap. If machining-gap voltage Vg is hardly detected, the machining gap between the wire electrode 1 and the workpiece is determined to be in a short-circuit state and the first switching element S1 is turned off after a fixed time passes. Up to here, the steps are the same as in the conventional technology, but the present invention is characterized in that a small current is supplied to the machining gap by simultaneously turning on the second switching element S2 for a fixed time. In this case, the current supplied to the machining gap is a small current and therefore, the wire electrode is not broken and if an open state arises even instantaneously while the small current is supplied, an edge of the work can slightly be removed by machining.

When the gap distance of the machining gap is sufficiently small and a discharge occurs even if the machining gap between the wire electrode 1 and the workpiece is in an open state, if a discharge caused by a discharge inducing pulse voltage is detected, the first switching element S1 is turned off and at the same time, the second switching element S2 is turned on for a fixed time to remove the workpiece by machining by supplying the same small current to the machining gap. In FIG. 8, the current peak value of the machining-gap current Ig in an open state is smaller than the current peak value of the machining-gap current Ig in a short-circuit state because of insulation resistance of a working fluid.

Then, a quiescent time is provided to restore insulation of the machining gap before completing one cycle.

Figure 9:
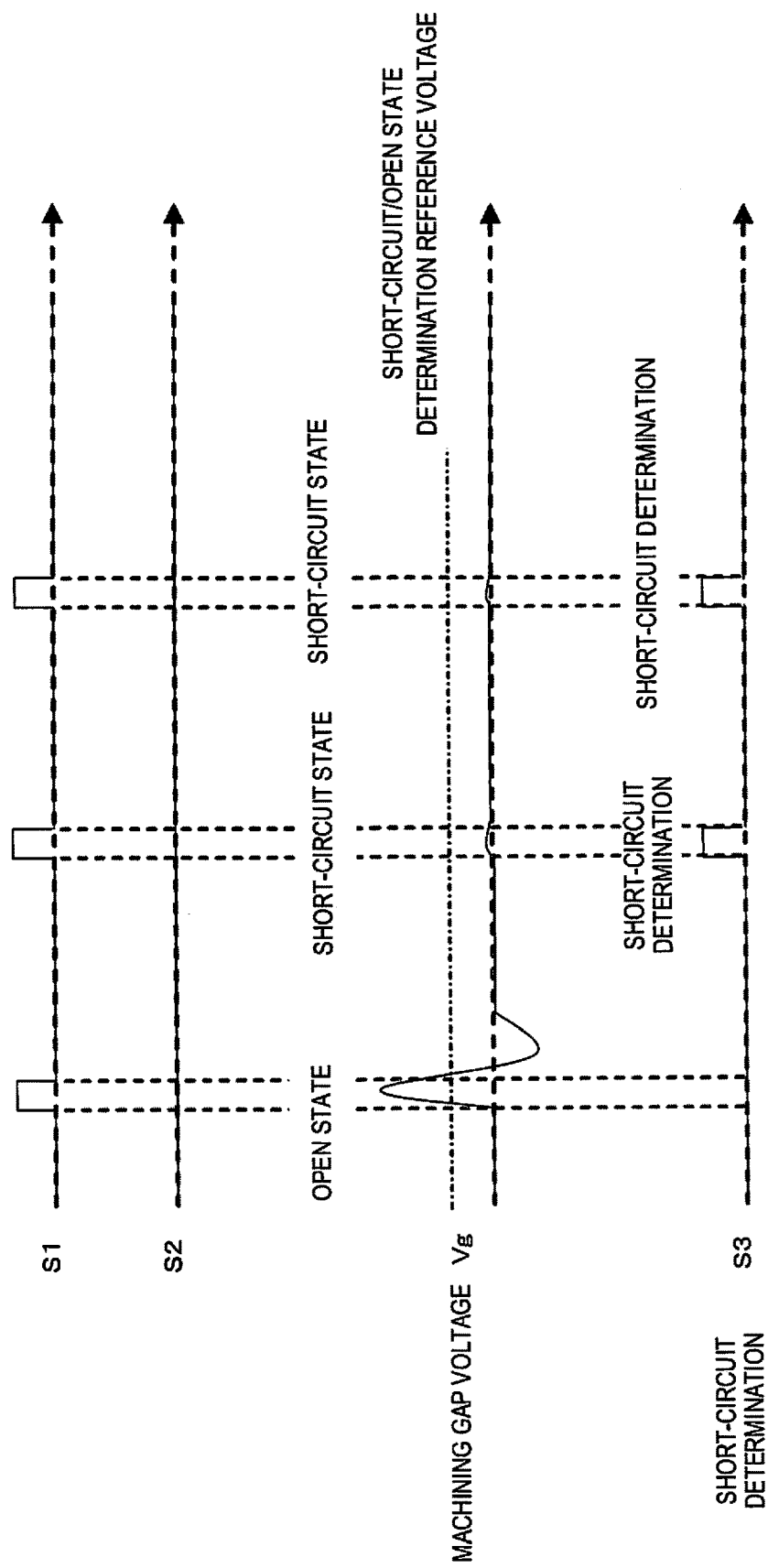
FIG. 9 is a time chart illustrating the relationship between the machining-gap voltage Vg and the machining-gap current Ig, and a short-circuit determination S3 of the machining gap when the first switching element S1 is controlled to apply a discharge inducing voltage to the machining gap between the wire electrode and the workpiece by a discharge inducing circuit included in the machining power supply circuit in FIG. 6.

FIG. 9 is a time chart illustrating the relationship between the machining-gap voltage Vg and the machining-gap current Ig, and the short-circuit determination S3 of the machining gap when the first switching element S1 is controlled to apply a discharge inducing voltage to the machining gap between the wire electrode 1 and the workpiece by the discharge inducing circuit 51 included in the machining power supply circuit 50 in FIG. 6.

When the machining gap is in an open state as shown in FIG. 9, if the first switching element S1 is turned on, it is detected that the machining-gap voltage Vg rises and exceeds the short-circuit/open state determination reference voltage and it is determined that the gap is in an open state (not in a short-circuit state) by the determination result of the short-circuit determination S3.

On the other hand, when the machining gap is in a short-circuit state, if the first switching element S1 is turned on, it is detected that the machining-gap voltage Vg does not exceed the short-circuit/open state determination reference voltage and it is determined that the gap is in a short-circuit state by the determination result of the short-circuit determination S3.

Figure 10:
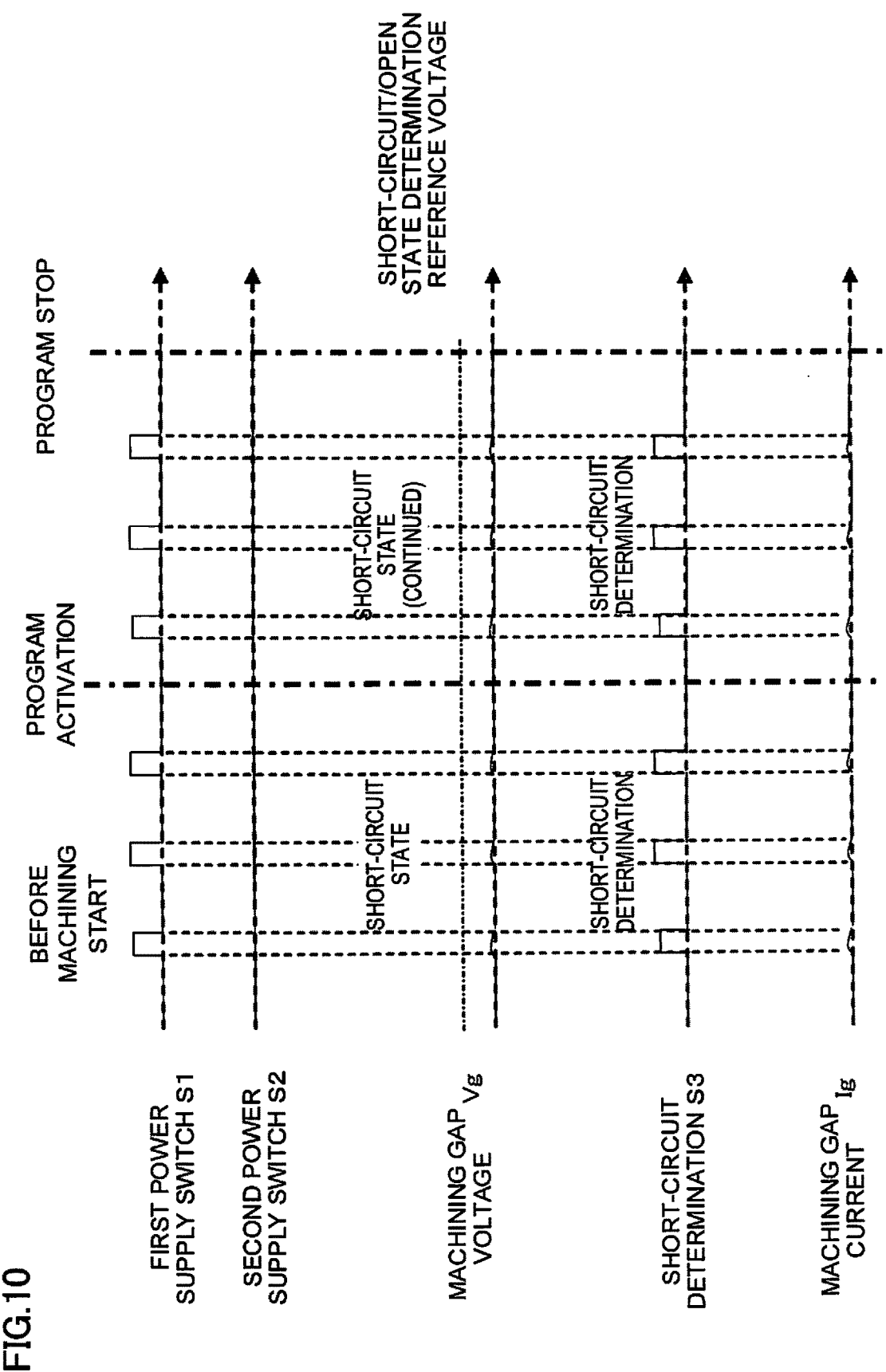
FIG. 10 is a time chart illustrating the relationship between the control of the first switching element S1 and the second switching element S2 of the machining power supply circuit, and the machining-gap voltage Vg, the machining-gap current Ig and the short-circuit determination S3 in a control operation performed by the controller included in the conventional wire electric discharge machine during short-circuit detection when machining is started.

FIG. 10 is a time chart illustrating the relationship between the control of the first switching element S1 (to apply a discharge inducing pulse voltage to the machining gap) and the second switching element S2 (to apply a machining pulse voltage to the machining gap) of the machining power supply circuit, and the machining-gap voltage Vg, the machining-gap current Ig and the short-circuit determination S3 in a control operation performed by the controller included in the conventional wire electric discharge machine during short-circuit detection when machining is started.

In the wire electric discharge machine according to the conventional technology, as shown in FIG. 10, if a control program for wire electric discharge machining is activated while a short-circuit state between the wire electrode 1 and the workpiece is detected before machining is started, the second switching element S2 is controlled, after the short-circuit state is detected by the first switching element S1, not to supply a discharge current to the machining gap while the second switching element S2 is in off-state, after the first switching element S1 is turned off, and if such a state continues for a fixed time, the control program for wire electric discharge machining is stopped, determining that wire electric discharge machining cannot be started.

Figure 11:
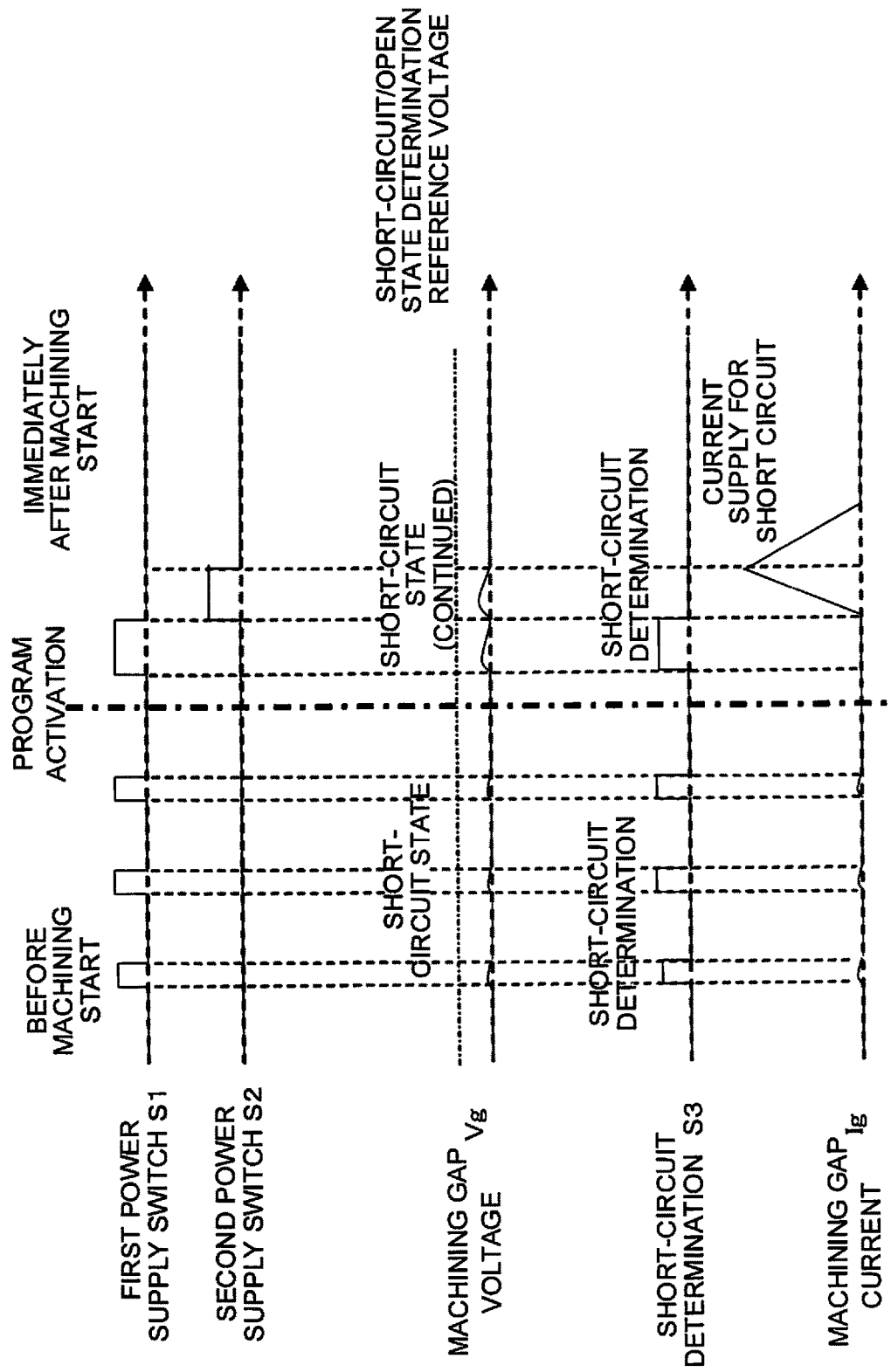
FIG. 11 is a time chart illustrating the relationship between the control of the first switching element S1 and the second switching element S2 of the machining power supply circuit in FIG. 6, and the machining-gap voltage Vg, the machining-gap current. Ig and the short-circuit determination S3 in the control operation during short-circuit detection when machining is started.

FIG. 11 is a time chart illustrating the relationship between the control of the first switching element S1 and the second switching element S2 of the machining power supply circuit 50 in FIG. 6, and the machining-gap voltage Vg, the machining-gap current Ig and the short-circuit determination S3 in the control operation during short-circuit detection when machining is started.

In the wire electric discharge machine 30 according to an embodiment of the present invention, as shown in FIG. 11, if the control program for wire electric discharge machining is activated while a short-circuit state between the wire electrode 1 and the workpiece is detected before machining is started, control is performed, after the short-circuit state is detected by the first switching element S1, such that the first switching element S1 is turned off and at the same time, the second switching element S2 is turned on for a fixed time to supply a small current to the machining gap, then the operation of the control program for wire electric discharge machining is continued.

In the wire electric discharge machine 30 according to an embodiment of the present invention, the magnitude of the current supplied to the machining gap is adjusted by an output voltage of the second DC power supply 55 and a switching time of the second switching element S2 and by making the output voltage and the switching time smaller or shorter, the wire electrode 1 can be controlled such that a small current and a normal machining discharge current are switched and supplied to the workpiece when necessary.

Hereinafter, the flow of control processing by a wire electric discharge machine according to an embodiment of the present invention will be described using FIGS. 12 to 15.

Figure 12:
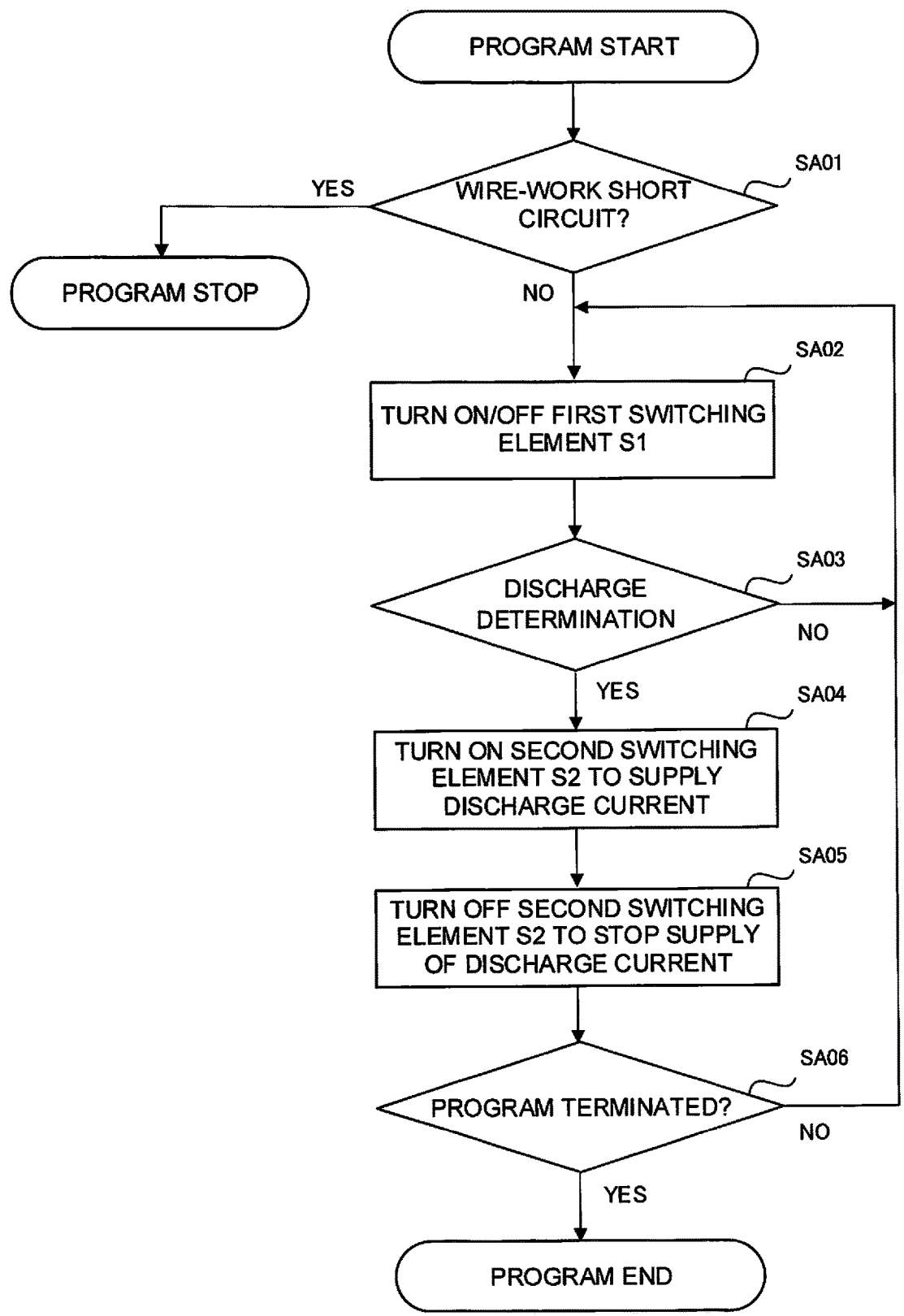
FIG. 12 is a flow chart showing a first example of control processing by the wire electric discharge machine according to a conventional technology.

FIG. 12 is a flowchart showing a first example of control processing by the wire electric discharge machine according to the conventional technology.

In the control processing shown in FIG. 12, a short-circuit alarm is issued and the program is stopped if a wire and workpiece are short-circuited in a small-diameter machining start hole. If not short-circuited, on the other hand, the transition to the cycle of electric discharge machining occurs.

[Step SA01] After a machining control program is started, a discharge inducing voltage is applied to a machining gap between a wire electrode and workpiece and it is determined whether the wire electrode and the workpiece are short-circuited or not. The program is stopped if the wire electrode and the workpiece are short-circuited and the program proceeds to Step SA02 if the wire electrode and the workpiece are not short-circuited (in an open state).

[Step SA02] A discharge inducing voltage is applied to the machining gap between the wire electrode and the workpiece by turning on and off the first switching element S1.

[Step SA03] It is determined whether or not a discharge is caused between the wire electrode and the workpiece by the discharge inducing voltage applied in Step SA02. The program proceeds to Step SA04 if a discharge is caused and returns to Step SA02 if no discharge is caused.

[Step SA04] The second switching element S2 is turned on to supply a large current for electric discharge machining to the machining gap between the wire electrode and the workpiece.

[Step SA05] The second switching element S2 is turned off to stop the supply of the large current for electric discharge machining to the machining gap between the wire electrode and the workpiece and machining is halted for a fixed time to restore insulation of the wire machining gap.

[Step SA06] It is determined whether the machining control program has terminated or not and program returns to Step SA02 if the machining control program has not yet terminated.

Figure 13:
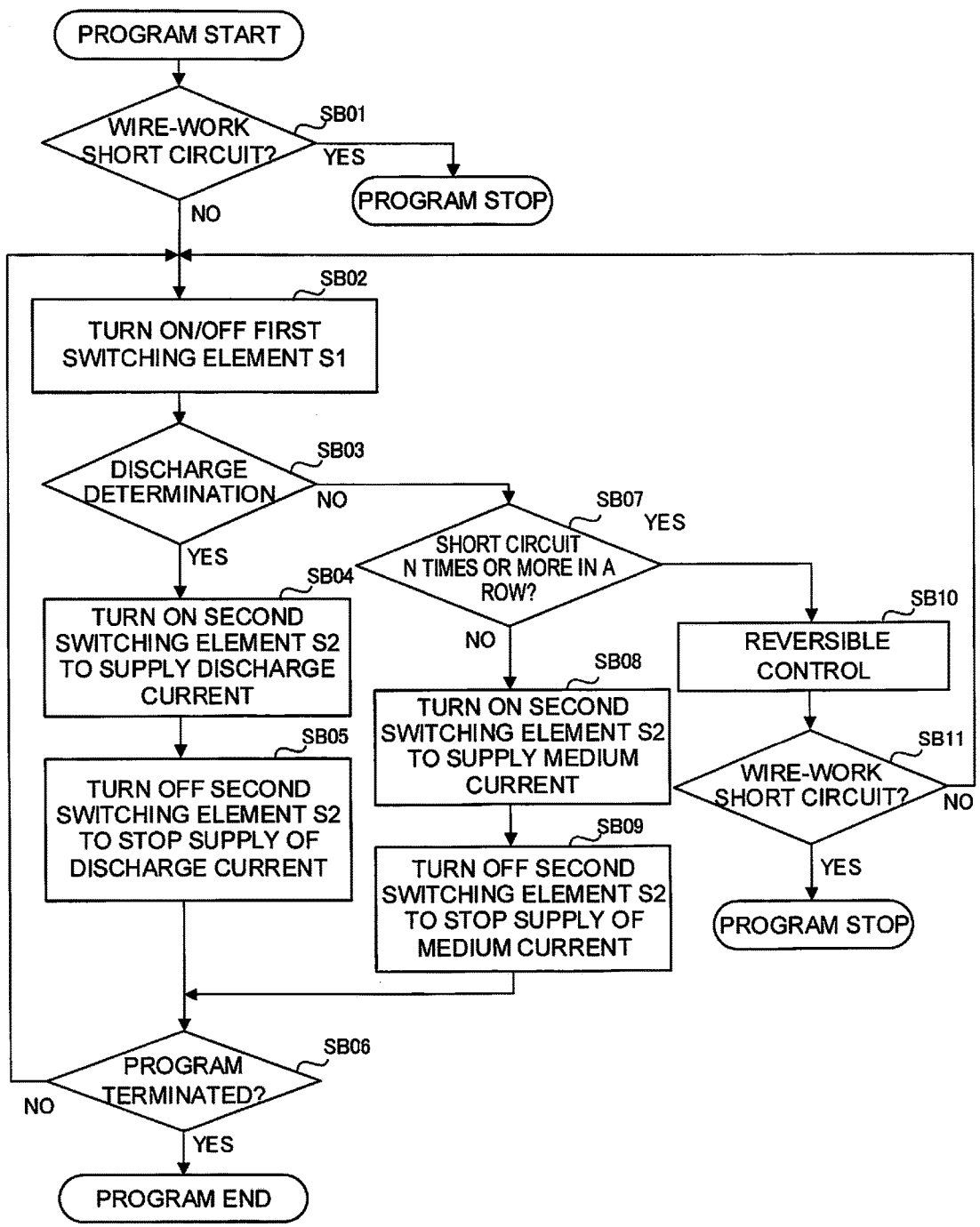
FIG. 13 is a flow chart showing a second example of the control processing by the wire electric discharge machine according to the conventional technology.

FIG. 13 is a flow chart showing a second example of the control processing by the wire electric discharge machine according to the conventional technology.

In the control processing shown in FIG. 13, electric discharge machining is started and if a short circuit is detected while in progress, the supply of a large current is stopped and a discharge determination by the first DC power supply is made and if a short circuit is detected predetermined N times or more in a row, the transition to reversible control that eliminates the short circuit state between the wire and the work by controlling the wire electrode to move backward over a machining path occurs and if the short circuit is not eliminated even after moving a predetermined distance backward in the reversible control, the program is stopped as a short-circuit alarm.

[Step SB01] After a machining control program is started, a discharge inducing voltage is supplied to a machining gap between a wire electrode and workpiece to determine whether the wire electrode and the workpiece are short-circuited or not. If the wire electrode and the workpiece are in a short-circuit state, the program is stopped, and if the wire electrode and the workpiece are not in a short-circuit state (if in an open state), the program proceeds to Step SB02.

[Step SB02] A discharge inducing voltage is applied to the machining gap between the wire electrode and the workpiece by turning on and off the first switching element S1.

[Step SB03] It is determined whether or not a discharge is caused between the wire electrode and the workpiece by the discharge inducing voltage applied in Step SB02. If a discharge is caused, the program proceeds to Step SB04, and if no discharge is caused, the program proceeds to Step SB07.

[Step SB04] The second switching element S2 is turned on to supply a large current for electric discharge machining to the machining gap between the wire electrode and the workpiece.

[Step SB05] The second switching element S2 is turned off to stop the supply of the large current for electric discharge machining to the machining gap between the wire electrode and the workpiece and machining is halted for a fixed time to restore insulation of the wire machining gap.

[Step SB06] It is determined whether or not the machining control program has terminated, and if the machining control program has not yet terminated, the program returns to Step SB02.

[Step SB07] When a short circuit is detected after starting electric discharge machining, it is determined whether or not a short circuit is detected predetermined N times or more in a row in the discharge determination in Step SB03. If the short-circuit is detected predetermined N times or more, the program proceeds to Step SB10, and if the short-circuit is not detected predetermined N times or more, the program proceeds to Step SB08.

[Step SB08] The second switching element S2 is turned on by controlling the second DC power supply to try a discharge by supplying a medium current to the machining gap between the wire electrode and the workpiece.

[Step SB09] The second switching element S2 is turned off to stop the supply of the medium current to the machining gap between the wire electrode and the workpiece before returning to Step SB06.

[Step SB10] The wire electrode is controlled to cause the wire electrode to move backward over a machining path and made transition to the reversible control that eliminates the short-circuit state between the wire and the workpiece.

[Step SB11] It is determined whether the machining gap between the wire electrode 1 and the workpiece is short-circuited or not. If short-circuited, the program is stopped, and if not short-circuited, the program proceeds to Step SB02.

Figure 14:
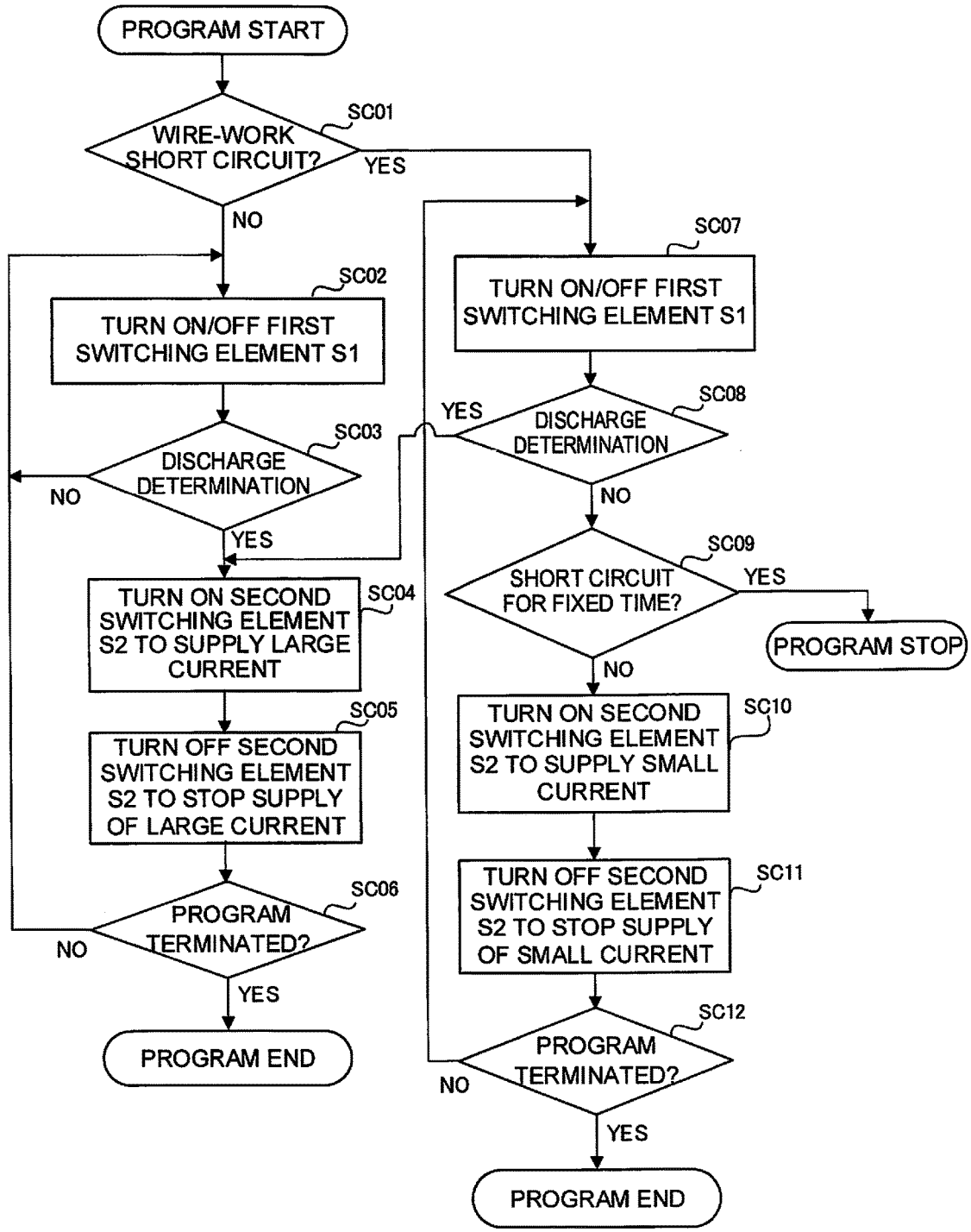
FIG. 14 is a flow chart showing a first example of control processing by the wire electric discharge machine according to the present invention.

FIG. 14 is a flow chart showing a first example of control processing by the wire electric discharge machine according to the present invention.

In the control processing shown in FIG. 14, a discharge determination by the first DC power supply 53 in the machining power supply circuit 50 in FIG. 6 is made even if a wire and workpiece are short-circuited in a small-diameter machining start hole and further, if the short circuit continues for a fixed time, the program is stopped as a short-circuit alarm and in the meantime, a cycle in which a discharge by the second switching element S2 with a small current is tried is repeated. If, at this point, a discharge is verified by a discharge determination by the first switching element S1, electric discharge machining by original machining energy is started by switching to the supply of a large current by the second switching element S2.

[Step SC01] After a machining control program is started, a discharge inducing voltage is applied to a machining gap between a wire electrode and workpiece to determine whether the wire electrode and the workpiece are short-circuited or not. If the wire electrode and the workpiece are in a short-circuit state, the program proceeds to Step SC07, and if the wire electrode and the workpiece are in an open state, the program proceeds to Step SC02.

[Step SC02] A discharge inducing voltage is applied to the machining gap between the wire electrode and the workpiece by turning on and off the first switching element S1.

[Step SC03] It is determined whether or not a discharge is caused between the wire electrode and the workpiece by the discharge inducing voltage applied in Step SC02. If a discharge is caused, the program proceeds to Step SC04, and if no discharge is caused, the program returns to Step SC02.

[Step SC04] The second switching element S2 is turned on to supply a large current for electric discharge machining to the machining gap between the wire electrode and the workpiece.

[Step SC05] The second switching element S2 is turned off to stop the supply of the large current for electric discharge machining to the machining gap between the wire electrode and the workpiece and machining is halted for a fixed time to restore insulation of the wire machining gap.

[Step SC06] It is determined whether the machining control program has terminated or not, and if the machining control program has not yet terminated, the program returns to Step SC02.

[Step SC07] A discharge inducing voltage is applied to the machining gap between the wire electrode and the workpiece by turning on and off the first switching element S1.

[Step SC08] It is determined whether or not a discharge is caused between the wire electrode and the workpiece by the discharge inducing voltage applied in Step SC07. If a discharge is caused, the program returns to Step SC04, and if no discharge is caused, the program proceeds to Step SC09.

[Step SC09] It is determined whether or not the short circuit is detected for a fixed time in a row in the discharge determination in Step SC08. If the short circuit is detected for a fixed time in a row, the machining control program is stopped, and otherwise, the program proceeds to Step SC10.

[Step SC10] The second switching element S2 is turned on by controlling the second DC power supply 55 to try a discharge by supplying a small current to the machining gap between the wire electrode and the workpiece.

[Step SC11] The second switching element S2 is turned off to stop the supply of the small current to the machining gap between the wire electrode and the workpiece.

[Step SC12] It is determined whether the machining control program has terminated or not, and if the machining control program has not yet terminated, the program returns to Step SC07.

Figure 15:
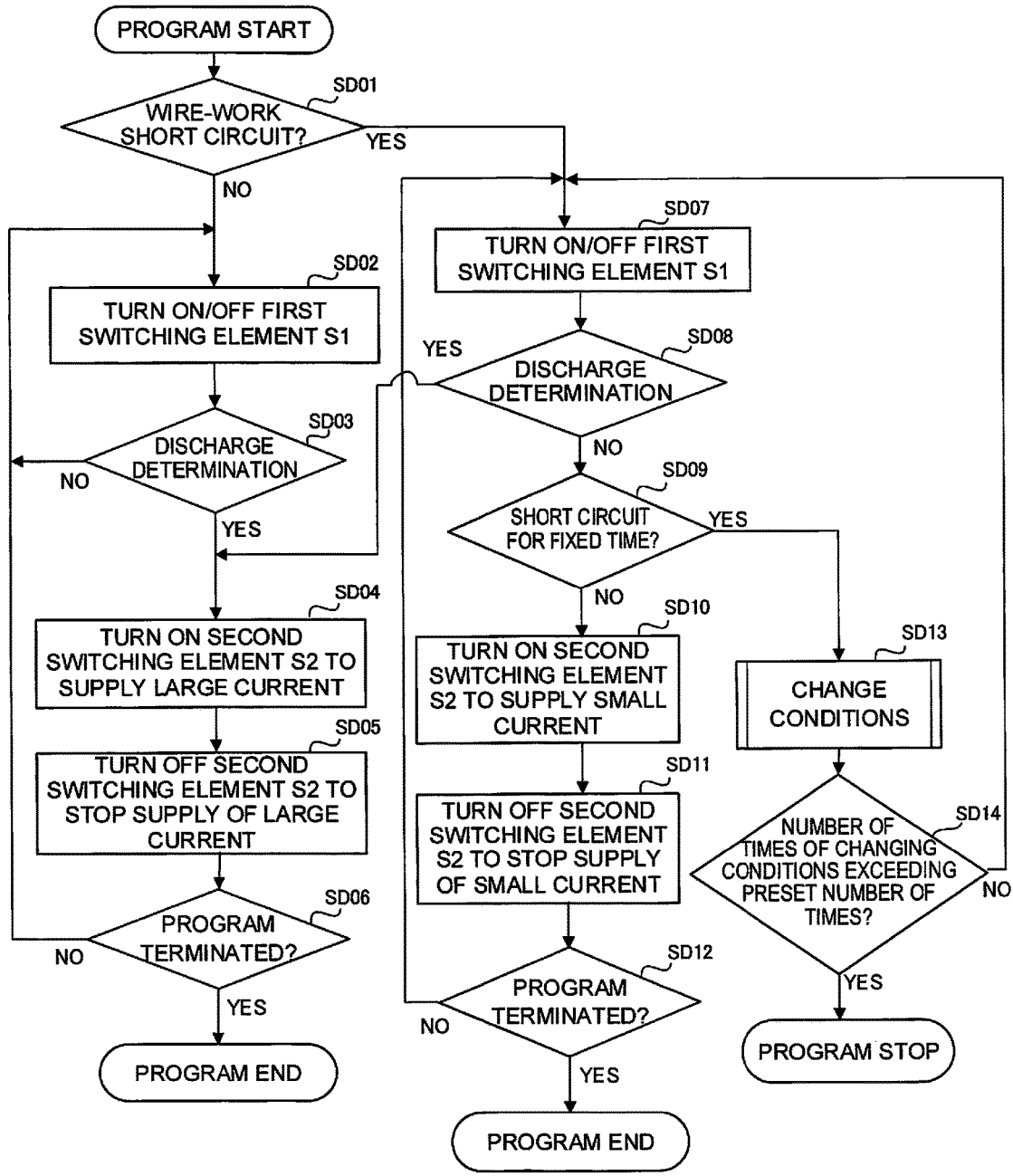
FIG. 15 is a flow chart showing a second example of the control processing by the wire electric discharge machine according to the present invention.
Figure 16A:
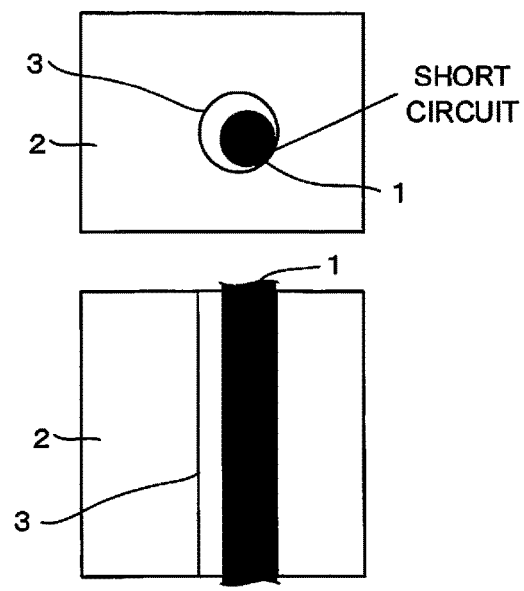
FIGS. 16A to 16D are diagrams showing examples of a short-circuit state of the wire electrode and the workpiece.
Figure 16B:
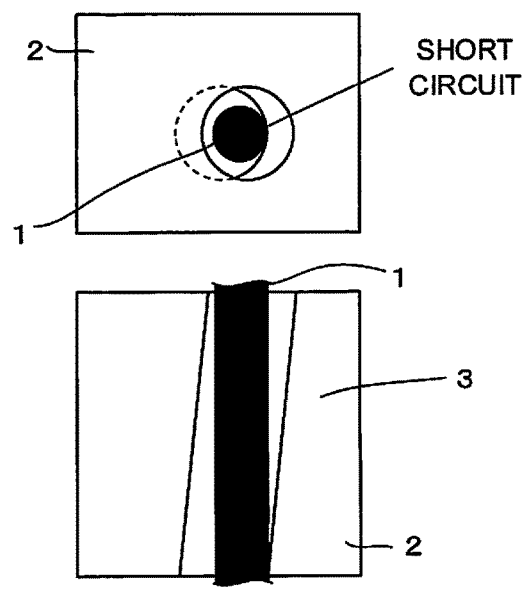
Figure 16C:
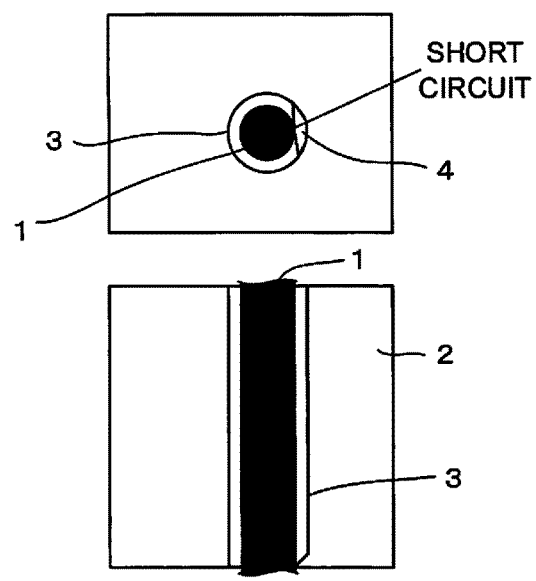
Figure 16D:
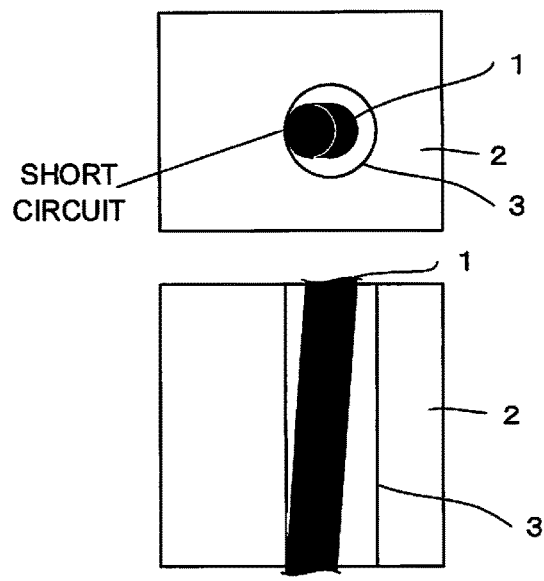

FIG. 15 is a flow chart showing a second example of the control processing by the wire electric discharge machine according to the present invention.

In the control processing shown in FIG. 15, in addition to the control processing shown in FIG. 14, if a short-circuit continues for a fixed time, instead of stopping the program as an alarm, a discharge determination by the first switching element S1 is repeated by further changing machining conditions. For example, machining conditions are changed such that a discharge is more likely to be determined by lowering short-circuit determination criteria in the discharge determination or the wire tension, the flow rate of a working fluid, or the wire feed speed is adjusted. Accordingly, a discharge is more likely to be caused in a semi-conduction state. If a discharge determination is not obtained after changing machining conditions a predetermined number of times, the program is finally stopped as an alarm.

[Step SD01] After a machining control program is started, a discharge inducing voltage is applied to a machining gap between a wire electrode and workpiece to determine whether the wire electrode and the workpiece are short-circuited or not. If the wire electrode and the workpiece are in a short-circuit state, the program proceeds to Step SD07 and, if the wire electrode and the workpiece are not in a short-circuit state (in an open state) the program proceeds to Step SD02.

[Step SD02] A discharge inducing voltage is applied to the machining gap between the wire electrode and the workpiece by turning on and off the first switching element S1.

[Step SD03] It is determined whether or not a discharge is caused between the wire electrode and the workpiece by the discharge inducing voltage applied in Step SD02. If a discharge is caused, the program proceeds to Step SD04 and, if no discharge is caused, the program returns to Step SD02.

[Step SD04] The second switching element S2 is turned on to supply a large current for electric discharge machining to the machining gap between the wire electrode and the workpiece.

[Step SD05] The second switching element S2 is turned off to stop the supply of the large current for electric discharge machining to the machining gap between the wire electrode and the workpiece and machining is halted for a fixed time to restore insulation of the wire machining gap.

[Step SD06] It is determined whether the machining control program has terminated or not and, if the machining control program has not yet terminated, the program returns to Step SD02.

[Step SD07] A discharge inducing voltage is applied to the machining gap between the wire electrode and the workpiece by turning on and off the first switching element S1.

[Step SD08] It is determined whether a discharge is caused between the wire electrode and the workpiece by the discharge inducing voltage applied in Step SD07. If a discharge is caused, the program returns to Step SD04 and, if no discharge is caused, the program proceeds to Step SD09.

[Step SD09] It is determined whether the short circuit is detected for a fixed time in a row in the discharge determination in Step SD08. If the short circuit is detected for a fixed time in a row, the program proceeds to Step SD13, and otherwise, the program proceeds to Step SD10.

[Step SD10] The second switching element S2 is turned on by controlling the second DC power supply 55 to try a discharge by supplying a small current to the machining gap between the wire electrode and the workpiece.

[Step SD11] The second switching element S2 is turned off to stop the supply of the small current to the machining gap between the wire electrode and the workpiece.

[Step SD12] It is determined whether the machining control program has terminated or not and, if the machining control program has not yet terminated, the program returns to Step SD07.

[Step SD13] Machining conditions are changed to make a discharge more likely in a semi-conduction state. For example, machining conditions are changed such that a discharge is more likely to be determined by lowering short-circuit determination criteria in the discharge determination or adjust the wire tension, the flow rate of a working fluid, or the wire feed speed.

[Step SD14] It is determined whether or not the number of times of changing machining conditions in Step SD13 exceeds a predetermined number of times set in advance. If exceeding a predetermined number of times, the program is stopped as a short-circuit alarm, and if not exceeding, the program returns to Step SD07.

The invention claimed is:

1. A wire electric discharge machine, comprising:
a discharge inducing circuit including a first DC power supply connected to a machining gap between a wire electrode and workpiece via a first switching element and a current limiting resistance;
a current supply circuit including a second DC power supply connected to the machining gap via a second switching element;
a voltage detection circuit that detects a voltage of the machining gap;
a short-circuit detection circuit that detects a short-circuit state between the wire electrode and the workpiece based on the voltage detected by the voltage detection circuit; and
a control circuit that controls on and off of the first switching element and the second switching element, wherein
the control circuit is configured to supply a first current to process the workpiece, and a second current until a predetermined state is reached after starting machining,
the second current being (i) smaller than the first current, (ii) insufficient to fuse the wire electrode even in a short-circuit state with the workpiece, but (iii) sufficient to form a discharge arc between the wire electrode and the workpiece, and
the first current and the second current are discrete and separated from each other.

2. The wire electric discharge machine according to claim 1, wherein the predetermined state is at least one of a preset time, a preset distance, and a preset number of times of discharge.

3. The wire electric discharge machine according to claim 1, wherein a magnitude of the second current is determined by an experiment while each of a diameter, a material and a type of the wire electrode, a material and thickness of the workpiece to be machined, a specific resistance of a working fluid, and a wire tension needed to cause the wire electrode to travel is set.

4. The wire electric discharge machine according to claim 1, wherein the control circuit is configured to change to preset machining conditions when the short-circuit detection circuit detects elimination of the short circuit between the wire electrode and the workpiece.

5. The wire electric discharge machine according to claim 4, wherein the control circuit is configured to control machining based on a machining program after changing to the preset machining conditions.

6. The wire electric discharge machine according to claim 1, wherein the control circuit is configured to control changes in at least one of a wire tension of the wire electrode, a flow rate of a working fluid, and a wire feed speed of the wire electrode until the short circuit is eliminated when the short circuit between the wire electrode and the workpiece is not eliminated before the predetermined state is reached.

7. A wire electric discharge machine, comprising:
a discharge inducing circuit including a first DC power supply connected to a machining gap between a wire electrode and workpiece via a first switching element and a current limiting resistance;
a current supply circuit including a second DC power supply connected to the machining gap via a second switching element;
a voltage detection circuit that detects a voltage of the machining gap;
a short-circuit detection circuit that detects a short-circuit state between the wire electrode and the workpiece based on the voltage detected by the voltage detection circuit; and
a control circuit that controls on and off of the first switching element and the second switching element, wherein the control circuit is configured to supply a first current to process the workpiece, and a second current until a predetermined state is reached when the short circuit is detected by the short-circuit detection circuit at a start of machining, the second current being (i) smaller than the first current, (ii) insufficient to fuse the wire electrode even in a short-circuit state with the workpiece, but (iii) sufficient to form a discharge arc between the wire electrode and the workpiece, and the first current and the second current are discrete and separated from each other.

8. A wire electric discharge machine, comprising:
a discharge inducing circuit including a first DC power supply connected to a machining gap between a wire electrode and workpiece via a first switching element and a current limiting resistance;
a current supply circuit including a second DC power supply connected to the machining gap via a second switching element;
a voltage detection circuit that detects a voltage of the machining gap;
a short-circuit detection circuit that detects a short-circuit state between the wire electrode and the workpiece based on the voltage detected by the voltage detection circuit; and
a control circuit that controls on and off of the first switching element and the second switching element, wherein the control circuit is configured to supply a first current to process the workpiece, and a second current until a predetermined state is reached after the wire electrode and the workpiece reach an open state by a pulse voltage being applied to the machining gap when the short circuit is detected by the short-circuit detection circuit at a start of machining, the second current being (i) smaller than the first current, (ii) insufficient to fuse the wire electrode even in a short-circuit state with the workpiece, but (iii) sufficient to form a discharge arc between the wire electrode and the workpiece, and the first current and the second current are discrete and separated from each other.

\* \* \* \* \*